(12) United States Patent
Rakhodai

(10) Patent No.: US 6,580,467 B1
(45) Date of Patent: Jun. 17, 2003

(54) TELEVISION CIRCUIT DESIGNED TO RECEIVE OR TRANSMIT SIGNALS FROM OR IN DIFFERENT DIRECTIONS

(75) Inventor: Issa Rakhodai, Montigny le Bretonneux (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/469,332

(22) Filed: Dec. 22, 1999

(30) Foreign Application Priority Data

Dec. 29, 1998 (FR) .............................. 98 16566

(51) Int. Cl.[7] .......................... H04N 5/268; H04N 9/67
(52) U.S. Cl. ..................... 348/705; 348/706; 348/659
(58) Field of Search ................... 348/705, 706, 348/725, 659; H04N 5/44, 5/268, 9/67

(56) References Cited

U.S. PATENT DOCUMENTS

| | | | | |
|---|---|---|---|---|
| 4,025,947 A | * | 5/1977 | Michael | 348/705 |
| 5,592,508 A | * | 1/1997 | Cooper | 348/659 |

FOREIGN PATENT DOCUMENTS

WO 9607267 A2 3/1996

OTHER PUBLICATIONS

"Functional Model of a Conditional Access System"EBU Review Technical No. 266, Dec. 21, 1995, p. 64–77.

* cited by examiner

Primary Examiner—Sherrie Hsia
(74) Attorney, Agent, or Firm—Daniel J. Piotrowski

(57) ABSTRACT

A circuit is disclosed for receiving or transmitting signals from or to different receiving or transmitting members. More particularly, the circuit includes, a microprocessor for at least unscrambling and demultiplexing, and a switching matrix for transmitting or receiving different data flows to or from various receiving or transmitting members. The switching matrix having at least a parallel type connection formed by a plurality of conductors and a serial type connection. Certain conductors of a parallel type connection serve at the same time for the serial type connections, and the circuit is provided with logic elements for controlling the switching of the signals corresponding to serial type connections to conductors provided for the signals corresponding to the parallel type connections, as desired.

4 Claims, 3 Drawing Sheets

US 6,580,467 B1

TELEVISION CIRCUIT DESIGNED TO RECEIVE OR TRANSMIT SIGNALS FROM OR IN DIFFERENT DIRECTIONS

BACKGROUND OF THE INVENTION

The invention relates to an integrated circuit for realizing a television device or peripheral television monitor.

It also relates to a TV decoding and receiving device provided with an integrated circuit comprising inter alia unscrambling means, conditional access means, demultiplexing means, and a microprocessor.

It finally relates to a connecting interface between a peripheral television monitor device and a television decoding and receiving device.

At the present moment most of the connections for the transport of a data flow called "MPEG2 Transport Stream" inside a TV set or monitor are of the parallel type, and it is necessary to provide comparatively complicated switching means involving a large number of conductors so as to be able to send or receive different data flows towards or from different receiving or transmitting members.

SUMMARY OF THE INVENTION

In the future there will be more and more connections of the serial type. Nevertheless, it remains necessary to have available connections of the parallel type so as to ensure the compatibility with existing circuits. The invention has for its object to offer extensive connection possibilities without using too many conductors, for example:

to facilitate the use of several unscrambling and conditional access modules referred to as "DVB Common Interface" in a receiver, generally, to facilitate the use of more external pieces of equipment.

To achieve this, an integrated circuit comprises a switching matrix controlled by a microprocessor and designed for transmitting or receiving different data flows of the MPEG type towards or from different receiving or transmitting members, said matrix comprising connections of the parallel type as well as connections of the serial type.

Multiple inputs or outputs of the serial type are advantageously constructed on the basis of a parallel connection, while the circuit is provided with means for controlling the application of signals of the serial type to conductors designed for the signals of the parallel type. For example, if a connection of the parallel type requires eleven conductors and a connection of the serial type requires four conductors, it is possible for twelve conductors to constitute either a connection of the parallel type comprising eleven of these twelve conductors or three connections of the serial type comprising four conductors each.

A TV receiving and decoding device, or an interface between a peripheral TV monitor and a TV receiving and decoding device advantageously comprises an integrated circuit according to the invention.

These and other, more detailed aspects of the invention will be explained further below in a description of an embodiment which forms a non-limitative example.

DETAILED DESCRIPTION OF THE INVENTION

Figure 1:
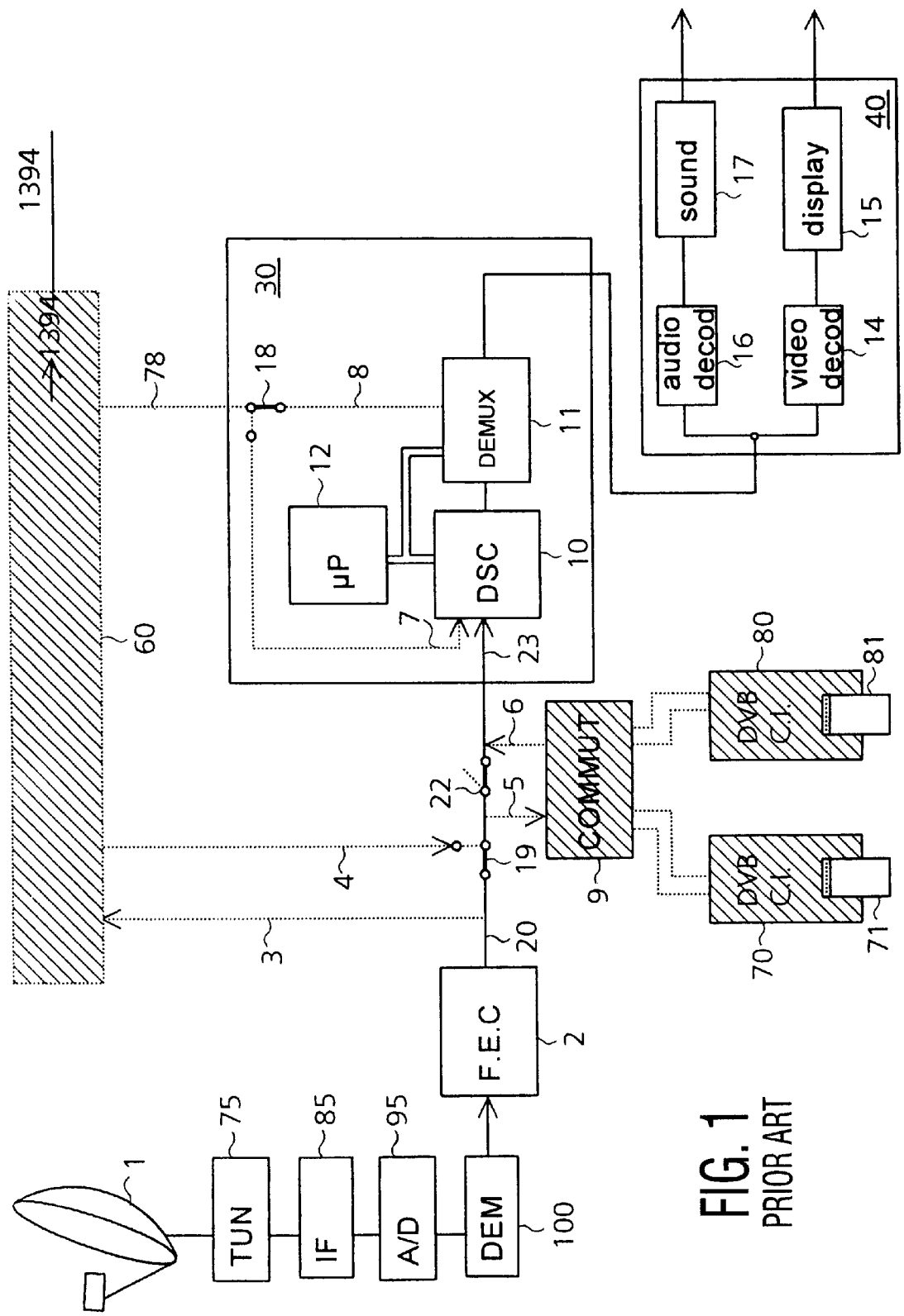
FIG. 1 diagrammatically shows a known TV receiving and decoding device in relation to which various connection possibilities are indicated.

A known TV receiving and decoding device is shown by way of example in FIG. 1. It comprises a parabolic antenna 1 here, comprising a frequency conversion block, followed by a tuner 75 and an intermediate frequency amplifier 85. The signal issuing from the intermediate frequency amplifier is converted into digital values in an A/D converter 95 and is subsequently demodulated by a demodulator 100. Finally, certain errors are corrected in an error corrector 2 ("Forward Error Correction").

The description given below relates to a non-limitative example: the input of the device might just as well be, for example, connected to a cable distribution system, in which case the modules 75 to 100 would be different.

The demodulated signal at the output of the error corrector 2 is called MPEG-2 TS ("MPEG-2 Transport Stream"): this is a signal comprising several programs with sound and data carried by one and the same signal, which may be scrambled in some cases.

In the simplest case, this MPEG-2 TS signal is directly supplied through a connection 20 of the parallel type to an unscrambling, conditional access, and demultiplexing integrated circuit 30. The signal is unscrambled there in an unscrambling circuit 10, transmitted to a microprocessor 12 via a bus, and then to a demultiplexer 11 also via a bus. The demultiplexer selects a program from the MPEG-2 TS signal. This program is applied in digital form on the one hand to a video decoder 14 and on the other hand to an audio decoder 16, said decoders supplying analog signals for projecting an image on a screen and generating sound from a loudspeaker, respectively. These decoders are followed by audio 17 and video 15 circuits connected to an external television, the device described here being a box which is designed to be connected to an input of a peripheral TV monitor or a classical TV set. Obviously, all these circuits may alternatively be incorporated in a TV set.

Elements shown hatched in the drawing indicate supplementary possibilities which will be described further below.

Certain service providers use a scrambling and conditional access method which cannot be treated by the unscrambling circuit 10, or they do not wish to divulge their scrambling or conditional access method and for this reason provide a dedicated conditional access and unscrambling module, for example in the form of a card of the PCMCIA format, which contains means specially adapted to the method, while the output signal is in accordance with a standard. An interface 70 is used in conjunction with this module; this interface referred to as "DVB Common Interface" is provided with a reader for a PCMCIA card 71. The signal on the connection 20 is conducted to the input of the interface 70 via a connection 5, of the parallel type at present, via a switch 9 whose role will be explained further below. The signal unscrambled by the card 71 is sent through the switch 9 to a connection 6 of the parallel type which is connected to an input 23 of the circuit 30. It is clear that, with the card 71 in the active state, the connection 20 between the lines 5 and 6 must be cut off, for example by means of the switch 22, and that the unscrambling circuit 10 does not perform any unscrambling actions on the signals which have already been unscrambled.

If one wishes to use several PCMCIA cards supplied by different service providers, it is necessary to insert the correct card at the moment one wants to view a transmission, depending on which service provider is involved. To avoid this manipulation, a standard provides for the possibility of inserting several interfaces in series. A second interface 80 provided with a reader for a second PCMCIA card 81 may be installed and operated upon demand by the switch 9, which is of the remote control type, thus rendering it possible to select either the interface 70 or the interface 80.

Another additional possibility is that a connecting interface 60 is used for an external or peripheral TV monitor device. This connecting interface is connected, for example, by a serial type "1394" connection to a known external device (not shown) which may be inter alia a digital video recorder or a so-called "DVD" recorder/player, or alternatively a computer hard disk.

A method of joining the connecting interface 60 to the decoding and receiving device is through the use of an input connection 3 of the parallel type and an output connection 4 of the parallel type which are connected to the connection 20. It is accordingly a data flow of the MPEG-2 TS type which is received or delivered through the connecting interface 60. When a signal is provided on the connection 4, the connection 20 must be cut off, for example by means of a switch 19. A disadvantage of this solution is that it is not possible to send a partial flow or an unscrambled flow to the exterior.

A second method of joining the connecting interface 60, which is the most widely used nowadays, is through the use of a bidirectional connection 78 of the parallel type which is connected through a switch 18 either directly to an output of the demultiplexer 11 via a connection 8 or to the input of the circuit 10 via a connection 7. The circuit 10 is provided with two inputs 7 and 23 of the parallel type. This second method offers the advantage that it renders possible the transmission to the exterior of all or part of the MPEG2 TS data flow, unscrambled if so desired, but it can operate only in one direction at a time. A complete solution would be the combination of the two above solutions and, for this purpose, it is necessary to provide a matrix of switching elements which is comparatively complicated.

Figure 2:
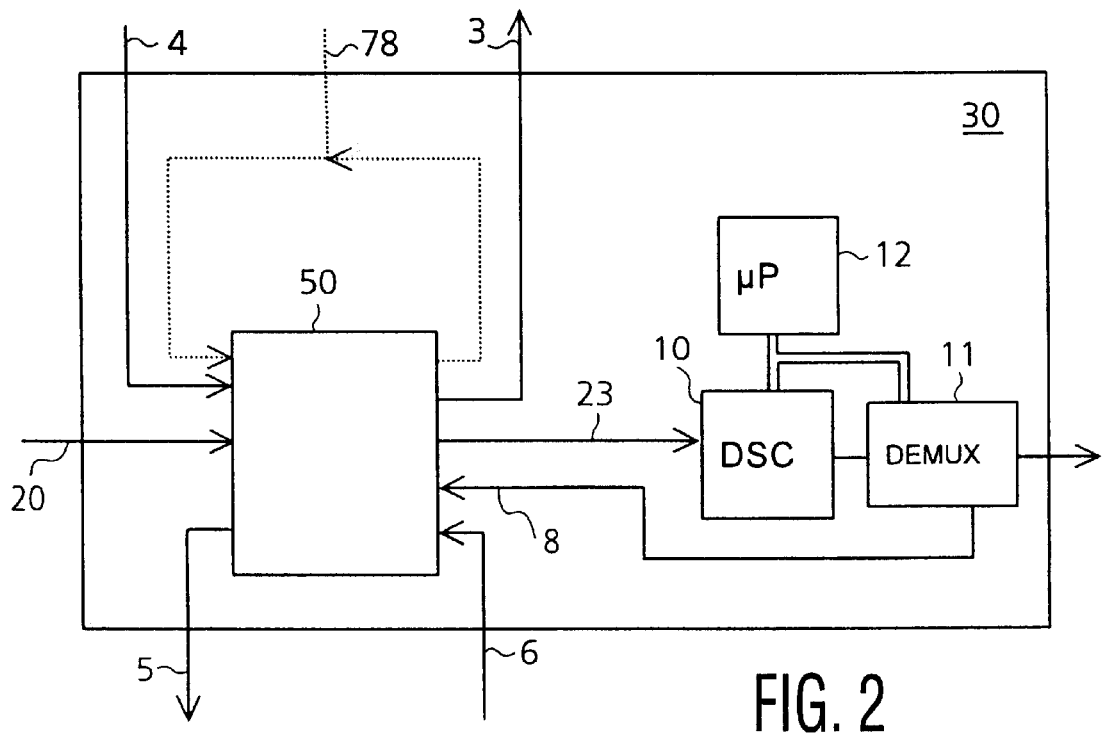
FIG. 2 is a diagram of a circuit for unscrambling, conditional access, and demultiplexing in accordance with the principles of the present invention.

An unscrambling, conditional access, and demultiplexing circuit 30 in which such a matrix 50 is incorporated is shown in FIG. 2. The matrix 50 has inputs for the connections 6, 20, 4, and 78, as well as outputs for the connections 23, 5, 78, and 3.

Figure 3:
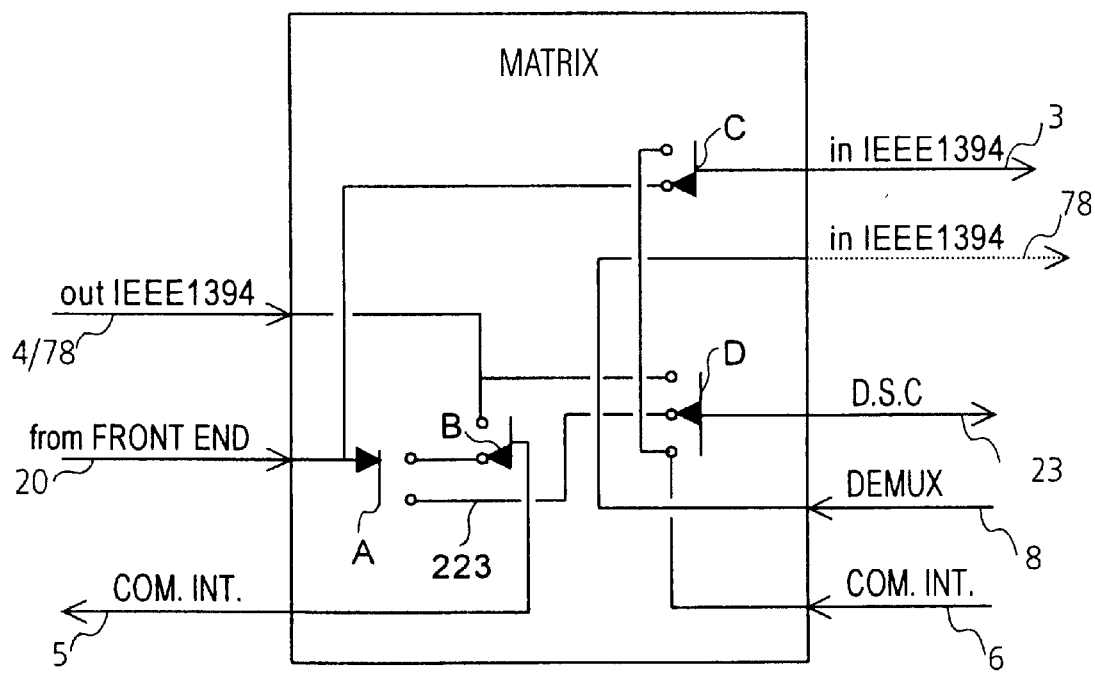
FIG. 3 is a more detailed diagram of a switching matrix.

An example of an embodiment of a switching matrix 50 comprising switches A, B, C, and D is shown in FIG. 3.

In the simplest case, in which a transmission must be received from the parabola 1 and processed by the unscrambler 10, the connection 20 may be joined to the connection 23 via the switches A and D in cascade arrangement and the connection 223.

If a PCMCIA card is to be used, the connection 20 may be joined to the connection 5 via the switches A and B in cascade arrangement, and the connection 6 may be joined to the connection 23 via the switch D.

In the case of the first method described above for connecting the connecting interface 60, the connection 3 may be joined to the connection 20 via the switch C, and the connection 4 may be joined to the connection 23 via the switch D, while the unscrambler 10 is active.

If a dedicated unscrambling and conditional access module is used as in the latter case described above, the input 4 may be joined to the connection 5 via the switch B, while the switch D now joins the connection 23 to the connection 6.

In the second method of connecting the connecting interface 60 via the bidirectional connection 78 of the serial type, the latter is joined both to the input referenced 4/78 and to the output 78; the connection 4/78 can be joined to the connection 23 via the switch D, and the connection 78 is connected directly to the input 8 in the switching matrix.

The connections of the parallel type which are normally used comprise eleven conductors; the switches are accordingly switches with eleven "contacts per position". The expression "contacts per position" is placed between inverted commas because they are neither contacts nor physical positions, but electronic switching elements. The connections, which are shown in the Figure each by a single line, are in reality a bundle of eleven conductors each time in the case of parallel connections, i.e. eight conductors for eight bits plus three additional conductors for a clock, a validation signal, and a synchronization signal. In the case of connections of the serial type, those normally used comprise four conductors: one conductor for a signal bit of the serial type plus three additional conductors for a clock, a validation signal, and a synchronization signal. The number of peripheral conductors of the matrix 50, especially those which leave the unscrambling, conditional access, and demultiplexing circuit 30, is very high. Thus the matrix of FIG. 3 comprises eleven conductors here for each of the connections 23 and 8, i.e. 22 conductors which remain inside the circuit 30, and eleven conductors for each of the connections 4/78, 20, 5, 6, 78, 3, i.e. 66 conductors which enter or leave the circuit 30.

To reduce the number of conductors so as to realize the circuit more easily in an integrated form, while the functions explained above are retained, certain connections of the switching matrix may be mixed, i.e. each connection then constitutes either a single connection of the parallel type or a multiple connection of the serial type, i.e. several connections of the serial type. In other words, the matrix may receive or supply signals through certain conductors in parallel form or, using the same conductors, in serial form, the desired configuration for this being obtained through programming.

Figure 4:
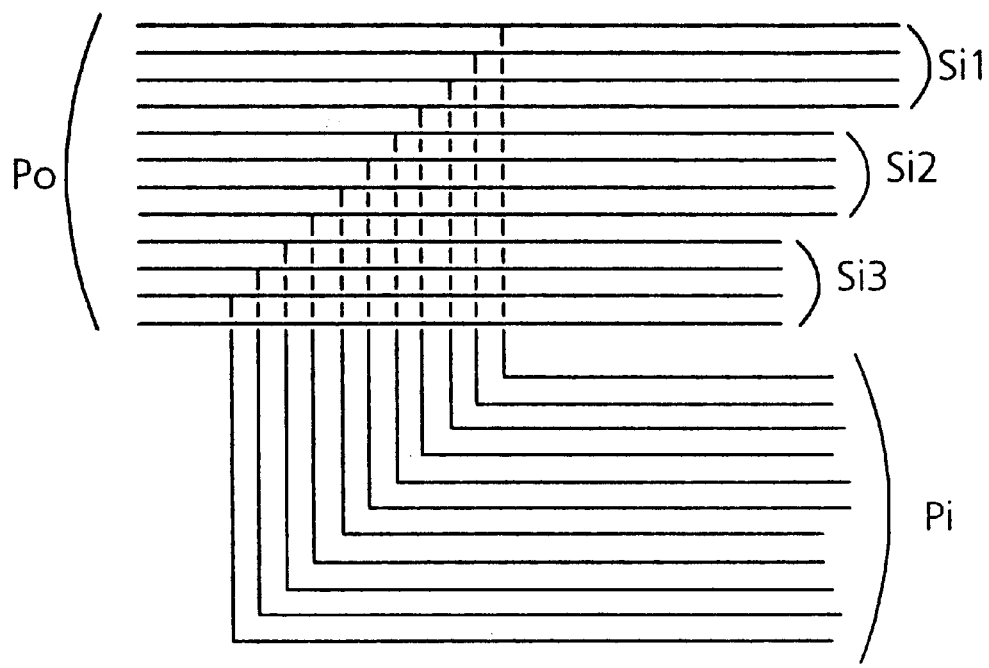
FIG. 4 is a detailed diagram of an embodiment of a mixed series/parallel conductor.

A connection of the parallel type preferably comprises twelve conductors instead of eleven, i.e. a twelfth, apparently useless conductor is provided. In this manner three connections of the serial type can be used instead of two at the price of a single supplementary conductor, i.e. 3×4=12 conductors. All conductors relating to one connection are shown in FIG. 4 by way of example. The connection Po comprises twelve conductors. Eleven of these twelve conductors are used for forming one connection of the parallel type Pi with eleven conductors, as represented by a single line in FIG. 3. The first four conductors of the twelve conductors of Po form four conductors for a first bundle of the serial type Si1. The next four conductors of Po form four conductors for a second bundle of the serial type Si2. The final four conductors form four conductors of a third bundle of the serial type Si3. Switches such as those of FIG. 3 render it possible to select one or several of the connections Si1, Si2, Si3, Pi.

Figure 5:
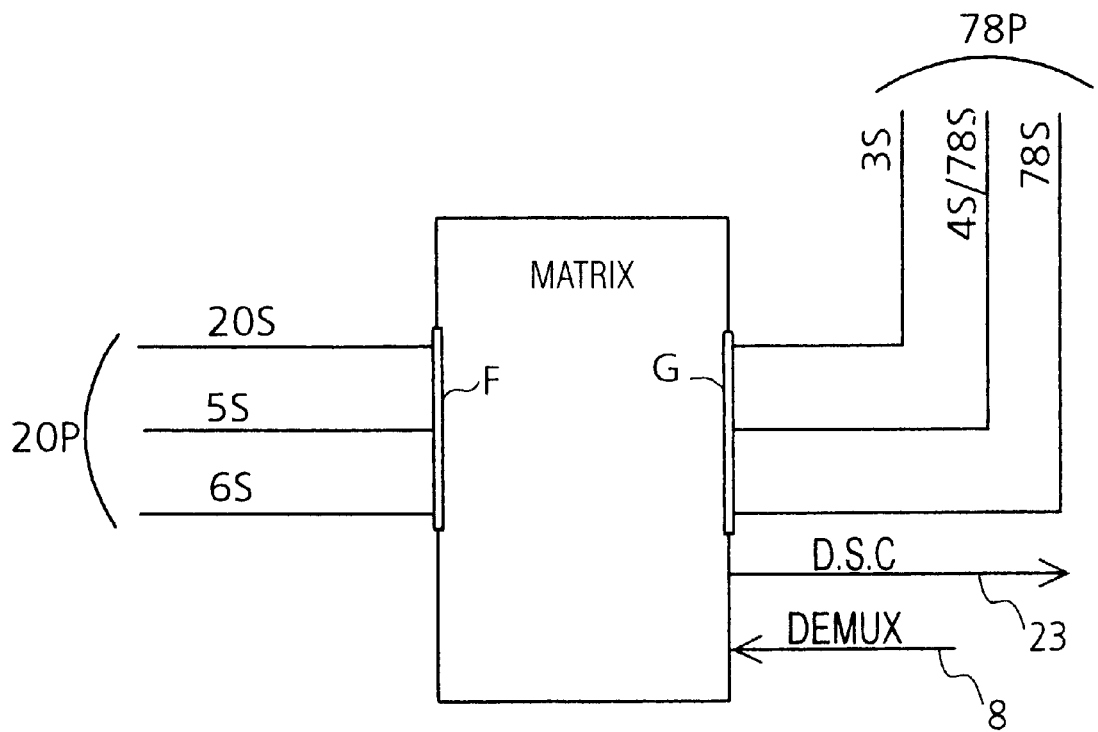
FIG. 5 illustrates a particular application of the invention.

In the application shown in FIG. 5, the matrix 50 has only two connections F and G with twelve conductors each. In this Figure, the number of a connection, for example 20P or 20S, indicates the connection having the same number (20) as in FIG. 1, with a suffix P or S which means "parallel" or "serial". The connection F renders possible the establishment of a parallel type connection 20P and the connection G renders possible the establishment of a parallel type connection 78P. The matrix comprises few conductors, but the connection possibilities are reduced if the connections of the parallel type only are used. However, if a configuration of the serial type is programmable, as explained with reference to FIG. 4, then three connections of the serial type 20S, 5S, 6S can be connected instead of a single connection 20P, and similarly three connections of the serial type 3S, 4S/78S, 78S can be connected instead of a single connection 78P.

Obviously, the invention is by no means limited to the example given, numerous modifications being readily conceivable:

all possible combinations of serial or parallel signals can be used with a number of conductors chosen as a function of the desired connections. It is accordingly possible to optimize the number of conductors as a function of the desired connections.

if, for example, the matrix 50 is provided with three connections of twelve conductors each, which would provide for the realization of nine connections of the serial type, the connections 5 and 6 could also be mixed, while a connection of the parallel type for a reader of a state of the art PCMCIA card can be transformed into several connections of the serial type. This possibility may be applied in several cases:

if one day "DVB common interfaces" with connections of the serial type should exist.

the module 9 with its six connections of the parallel type has 66 conductors. It would be possible to provide several (two in this case) small serial/parallel converter modules to be connected each to a "DVB common interface" 71, 81 of the present type via connections of the parallel type, and to connect them to the matrix 50 via connections of the serial type.

moreover, a connecting interface 60 as shown in FIG. 1 comprises three connections 3, 4, 78 of the parallel type, i.e. 33 conductors, without counting the output 1394. This also could be equipped with a matrix of the kind described with reference to FIGS. 4 and 5, which would render it possible with no more than 12 conductors to branch off, for example, either a single connection of the parallel type 78, or the three connections 3, 4, 78 if these are of the serial type.

What is claimed is:

1. An integrated circuit for realizing a television device or peripheral television monitor, said integrated circuit comprises a switching matrix controlled by a microprocessor and designed for transmitting or receiving different data flows of the MPEG type towards or from different receiving or transmitting members, said matrix comprising connections of the parallel type as well as connections of the serial type, wherein a multiple connection of the serial type is formed on the basis of one connection of the parallel type, the circuit being provided with means for controlling the application of signals of the serial type to conductors designed for the signals of the parallel type.

2. An integrated circuit as claimed in claim 1, wherein twelve conductors are provided for a connection of the parallel type which requires eleven conductors, so as to form either a connection of the parallel type comprising eleven of the twelve conductors, or three connections of the serial type comprising four conductors each.

3. A television receiving and decoding device provided with an integrated circuit comprising inter alia unscrambling means, conditional access means, demultiplexing means, and a microprocessor, characterized in that said integrated circuit for realizing a television device or peripheral television monitor, said integrated circuit comprises a switching matrix controlled by a microprocessor and designed for transmitting or receiving different data flows of the MPEG type towards or from different receiving or transmitting members, said matrix comprising connections of the parallel type as well as connections of the serial type, wherein a multiple connection of the serial type is formed on the basis of one connection of the parallel type, the circuit being provided with means for controlling the application of signals of the serial type to conductors designed for the signals of the parallel type.

4. A connecting interface between a peripheral television monitor device and a television receiving and decoding device, said connecting interface comprises an integrated circuit for realizing a television device or peripheral television monitor, said integrated circuit comprises a switching matrix controlled by a microprocessor and designed for transmitting or receiving different data flows of the MPEG type towards or from different receiving or transmitting members, said matrix comprising connections of the parallel type as well as connections of the serial type, wherein a multiple connection of the serial type is formed on the basis of one connection of the parallel type, the circuit being provided with means for controlling the application of signals of the serial type to conductors designed for the signals of the parallel type.

* * * * *